United States Patent [19]

Berglund

[11] Patent Number: 5,136,549

[45] Date of Patent: Aug. 4, 1992

[54] MARINE HYDROPHONE

[75] Inventor: Carl O. Berglund, Houston, Tex.

[73] Assignee: Teledyne Exploration, Houston, Tex.

[21] Appl. No.: 762,337

[22] Filed: Sep. 19, 1991

[51] Int. Cl.$^5$ .............................................. G01V 1/38
[52] U.S. Cl. ...................................... 367/20; 367/154;
367/155; 367/188; 367/160; 310/337; 181/112
[58] Field of Search ............... 367/20, 154, 155, 177,
367/188, 163, 174, 160; 310/337; 181/112

[56] References Cited

U.S. PATENT DOCUMENTS

| | | | |
|---|---|---|---|
| 2,976,434 | 3/1961 | Henry et al. | 310/9.4 |
| 3,255,431 | 6/1966 | Howatt | 367/163 |
| 3,418,624 | 12/1968 | Massa | 367/188 |
| 3,660,809 | 5/1972 | Pearson | 340/140 X |
| 3,970,878 | 7/1976 | Berglund | 310/8.6 |
| 3,993,859 | 11/1976 | McNeel | 367/188 |
| 4,336,639 | 6/1982 | Berglund | 29/25.35 |
| 4,517,664 | 5/1985 | Berglund | 367/163 |
| 4,926,397 | 5/1990 | Robertson | 367/157 |

Primary Examiner—J. Woodrow Eldred
Attorney, Agent, or Firm—William A. Knox

[57] ABSTRACT

A hydrophone is provided for use with a hydrophone array enclosed in a streamer cable that is deployed in a body of water. The active transducer elements of the hydrophone are electrically isolated from the sealed metal case in which they are mounted. The signal input and output terminals are protected from short-circuiting due to water invasion of a faulty streamer cable jacket.

4 Claims, 2 Drawing Sheets

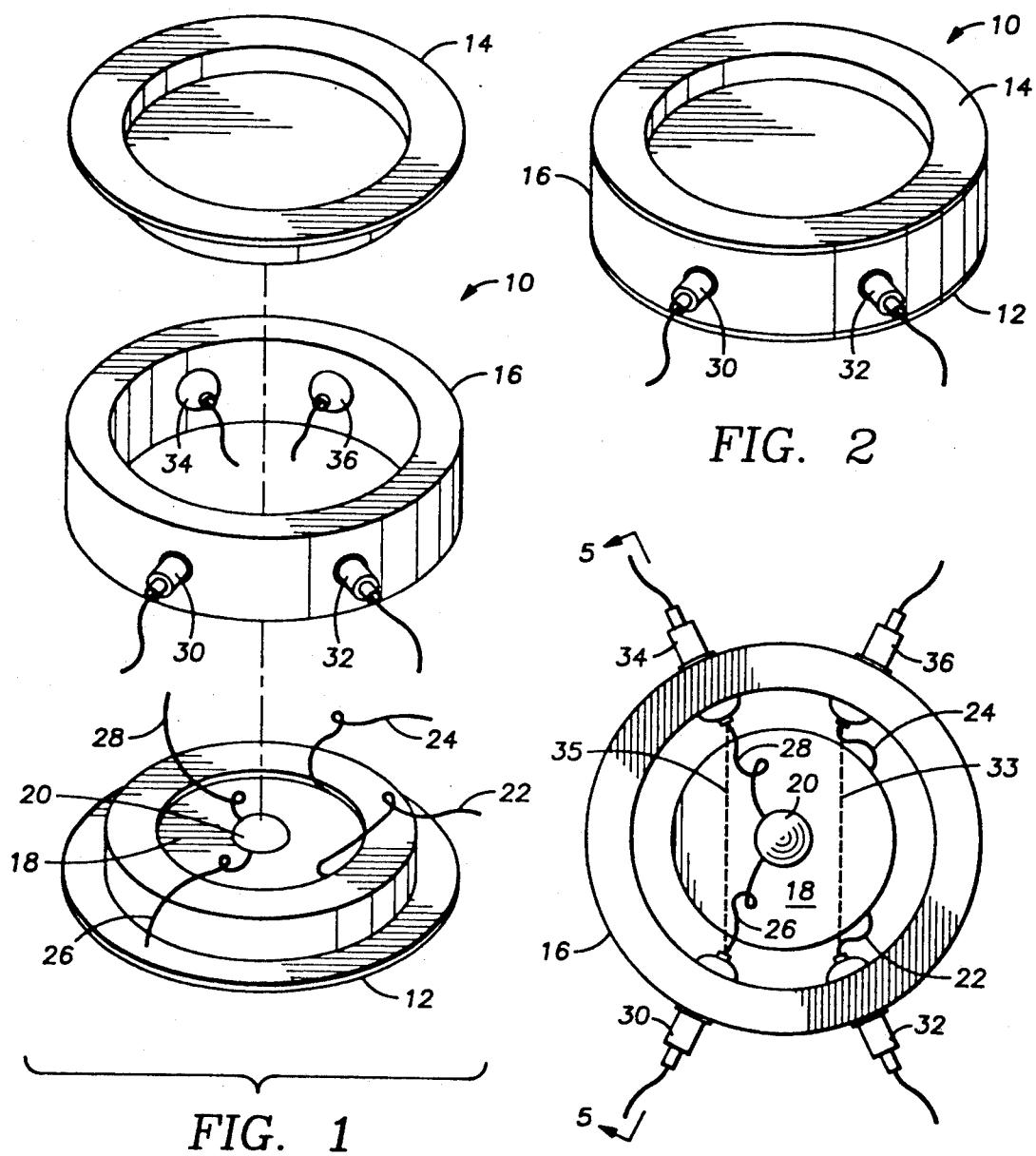
FIG. 1
FIG. 2
FIG. 3
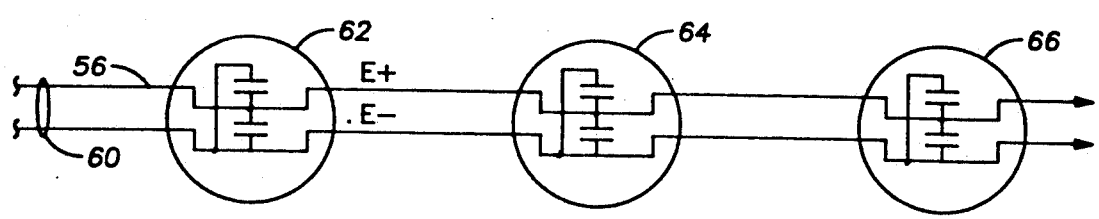
FIG. 7

MARINE HYDROPHONE

BACKGROUND OF THE INVENTION

1. Field of the Invention

This invention is concerned with an improved hydrophone for use in a hydrophone array deployed in a body of water. The hydrophone is insulated to prevent signal degradation due to conductive water pathways between hydrophone terminals due to water invasion.

2. Discussion of the Prior Art

In marine geophysical exploration, a ship tows a seismic streamer cable through a body of water along an assigned line of survey. The streamer cable may be 5,000 meters long and may contain many hundreds of hydrophones. At intervals, an acoustic wavefield is generated in the water. The acoustic wavefield travels downwardly and into the sub-water-bottom strata whence it is reflected back to the water surface where the reflected wavefield is detected by the hydrophones as electrical signals. The detected reflection signals are recorded for later analysis.

The seismic streamer cable typically includes a plurality of individual sections, each about 100 meters long. A section consists of a plastic tube or skin of polyurethane or the like, a few centimeters in diameter. Each end is terminated by a means for interconnecting the respective sections mechanically and electrically together to make up the full streamer cable. A section includes stress members, usually three, that extend from one section termination to the other, to absorb the towing forces. A plurality of hydrophones are emplaced along the section at intervals of a meter or less. The hydrophones are electrically interconnected into groups or arrays of ten or more sensors each, by color-coded conductors integrated into a wire bundle that runs along the length of the section, one pair of conductors per group. The section terminations include multi-contact electrical connector plugs so that signals from each group may be transmitted separately to a multi-channel recording device on the towing ship, one array per channel. The hydrophone signals are bi-polar, that is, one line is connected to a positive pole and the other line is connected to a negative pole of the hydrophone.

The section carcass, that is, the stress members, the wire bundle and the hydrophones are heavy. The cable section is therefore filled with a floatation fluid such as odorless kerosene so that the cable will be neutrally buoyant in the water. The fluid serves the additional purposes of electrically insulating the exposed hydrophone terminals and wire connections as well as providing a fluid medium for transmitting the hydrodynamic pressure variations, resulting from an acoustic pulse, from the surrounding water, to the hydrophones.

Typically, a hydrophone consists of a piezo-electric ceramic wafer cemented to each of a pair of thin metal diaphragms that are soldered or welded to the opposite ends of a short cylindrical metallic spacer to form a sealed case. The opposite surfaces of the wafers are silvered and the wafers are polarized. An electrical signal lead is soldered to one of the silvered surfaces. A feed-through, insulated terminal is mounted in the side of the cylindrical spacer, coupled to the signal lead, for electrical communication with the outside world. The other side of the wafer is cemented to the diaphragm by a conductive epoxy. The case forms one side and the feed-through terminal forms the other side of the bipolar hydrophone circuit. Variations in the hydrodynamic pressures in the surrounding water due to transient acoustic wavefields flex the piezo-electric wafers. Flexation of a wafer generates an electric charge thereon to create an electric signal proportional to the pressure changes. See for example, U.S. Pat. Nos. 3,970,878, 4,336,639 and 4,517,664, all assigned to the assignee of this invention, for a description of typical construction methods and materials.

The hydrophones making up a hydrophone array are mounted mechanically in the streamer section at appropriate spacings. Electrical leads interconnect each one of an array of hydrophones, in parallel, to the two wires in the wire bundle that are assigned to service that array. That wire-pair serves as a signal trunk line for the array as a whole with the interconnecting leads between each hydrophone of the array and the wire bundle serving as branch lines. Typically, the connections of the branch lines to the trunk line are in the form of wire-wrapped or soldered Y connections.

So long as the integrity of the cable skin is preserved, the floatation fluid insulates the exposed electrical connections. Sometimes, sharks bite and puncture the cable skin or shrimp boats run over and gash the streamer cable which is usually deployed a few meters beneath the water surface. If the skin of a section is punctured, water invades the cable. Water, particularly salt water, provides a short-circuit pathway between the exposed hydrophone case and the feed-through terminal. Although the streamer cable may still be mechanically intact, it becomes electrically inert. It must be retracted back into the ship for repair or replacement of the damaged section. On the large seismic ships in current use, a shut-down merely due to electrical failure, costs many tens of thousands of dollars.

It is, of course, possible to cover the hydrophones and their exposed signal output terminals with a suitable potting compound. However, that material severely degrades the signal output strength and may even seriously distort the signal. Furthermore, the customary Y connections are very difficult to insulate against water seepage and water-wicking at the connections between the branch lines and the trunk line.

This invention provides a hydrophone whose terminals are completely isolated from one another and which are unaffected by water invasion; the invention provides a means for eliminating the troublesome Y connections to the trunk lines in the wire bundle. In the event of non-catastrophic mechanical damage to the streamer cable, electrical integrity is preserved without the need for immediate cable recovery for repairs.

In this disclosure, the term hydrostatic pressure refers to the pressure due to the weight of a column of water of a specified height. The term hydrodynamic pressure refers to variations in water pressure due to a transient acoustic wavefield.

SUMMARY OF THE INVENTION

I provide a hydrophone of a type for use as a member of an array of hydrophones for deployment in a body of water. The hydrophone consists of a sealed case having wall, preferably cylindrical, with deformable end portions, having inner and outer surfaces, that are sealed to the ends of the wall. Polarized piezo-electric wafers are cemented to the inner surfaces of the deformable end portions by an insulating bonding agent. Each wafer thus has an inwardly and an outwardly facing pole. Like-facing poles of the wafers are coupled in parallel by bi-polar circuit leads for receiving electrical signals caused by flexing of the wafers when the end portions are deformed by variations in hydrodynamic pressure due to transient acoustic wavefields. Feed-through terminals are mounted in and insulated from the wall of the case. The bi-polar circuit leads are coupled to the respective terminals to provide output signals from the hydrophone.

In an embodiment of this invention, each of the signal input and signal output terminals are interconnected, inside the sealed case, by trunk lines. The bi-polar circuit leads are connected in parallel to the trunk lines.

Configured in an array, the output terminals of each one of the hydrophones in the array are electrically connected to the input terminals of the next hydrophone in the array in tandem.

Insulating means are disposed over the external portions of the terminals inhibit formation of a conductive water pathway between terminals.

BRIEF DESCRIPTION OF THE DRAWINGS

A better understanding of the benefits and advantages of this invention will be gleaned from the appended description of the preferred embodiment and the drawings, wherein like reference figures refer to like parts:

FIG. 1 is an exploded isometric view of the hydrophone of this invention;

FIG. 2 is an isometric view of the assembled unit;

FIG. 3 is an interior view of the hydrophone with the top deformable end portion removed;

FIG. 7 shows the method of coupling the hydrophones into an array in a seismic streamer cable.

DETAILED DESCRIPTION OF THE PREFERRED EMBODIMENT

Figure 4:
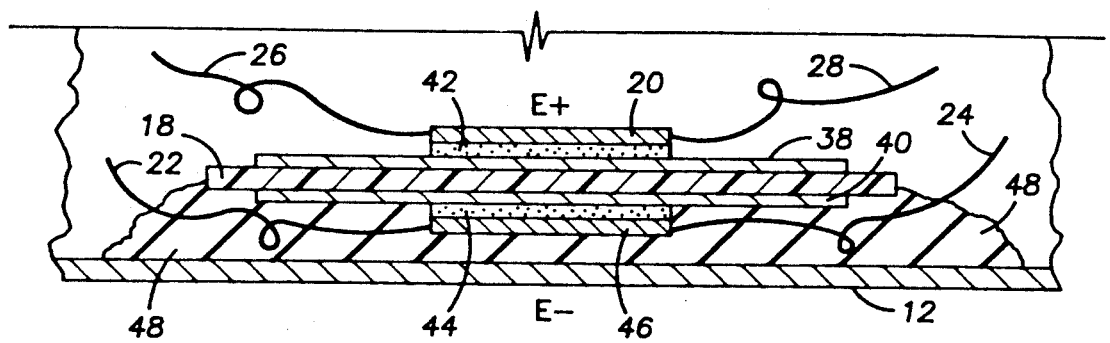
FIG. 4 is an exaggerated cross section of the method of supporting a wafer on the deformable end portion.

FIG. 1 is an exploded view of hydrophone 10. Hydrophone 10 consists of two deformable end portions, 12 and 14, that fit into the ends of a wall portion 16 that is preferably cylindrical although it need not be. Deformable end portions 12 and 14 have an inner surface and a dished-in outer surface as shown. The deformable end portions could of course, be flat rather than dished-in or they could be outwardly cupped as shown in the '878 patent. However, the dished-in shape is preferable because the depressed outer surface is somewhat protected from mechanical abrasion. The end portions are preferably made by cold-stamping from a beryllium-copper alloy metal sheet about 0.010 inch thick. The wall portion may be of brass or stainless steel and, for mechanical strength, it may be somewhat thicker than the end portions. In the outwardly-cupped configuration, the walls of the cups themselves serve as a wall portion after assembly of the hydrophone. Alternatively, the wall portion may be made of a tough plastic such as Lexan. When fully assembled, the hydrophone is quite compact: It is about 2 cm in diameter and about 1 cm thick.

A polarized piezo-electric transducer element 18, preferably a ceramic wafer made of a material such as lead zirconate or the like is cemented to the inner surface of end portion 12 by an insulating bonding agent as will be discussed later in connection with FIG. 4. A similar wafer is cemented to the inner surface of end portion 14 but in not visible in the isometric exploded view of FIG. 1. As also will be discussed later, each pole (that is, the opposite sides) of wafer 18 is silver-plated. An electrode, 20, of some material such as annealed beryllium-copper foil less than 0.001 inch thick is cemented to the silvered surface of the wafer by a conductive epoxy. The electrode may be formed by photo-etching with or without integral electrical leads. One side of the material from which the electrode is formed may be impregnated with a dielectric coating. A similar electrode, not visible in FIG. 1 is bonded to the other pole of wafer 18 on its underside. Electrical leads 22, 24 and 26, 28 may be soldered to the respective electrodes. Alternatively, the leads may be an integral part of the photo-etched electrode as above-described. The leads serve as bi-polar circuit leads to couple the piezo-electric elements to the outside world via feed-through insulating terminals 32, 36 and 30, 34. By convention, the inwardly facing poles are preferably positive.

In FIG. 2, the end portions 12 and 14 are shown assembled to the wall portion 16. After assembly, deformable end portions 12 and 14 are preferably soldered or welded to the wall portion to form a hermetically sealed case.

FIG. 3 is a top view of the hydrophone assembly with the top end portion removed to show certain details more clearly. Earlier, it was pointed out that in conventional art, the hydrophone signal output lines were customarily connected in parallel to a pair of conductors, that is, to the signal trunk lines in the seismic cable by means of Y-connections. In this invention, the hydrophone itself comprises a portion of the signal trunk line. To that end, an optional feed-through line 33 interconnects terminals 32 and 36 while feed-through line 35 interconnects terminals 30 and 34, as shown by the dashed lines in the drawing. Circuit leads 22 and 24 therefore form branch lines to trunk line 33 and circuit leads 26 and 28 act as branch lines to trunk line 35. The troublesome Y-connection has been removed from the seismic cable, into the hydrophone case where the connection is properly insulated.

FIG. 4 is a grossly exaggerated cross section showing the details of mounting a ceramic piezo-electric wafer such as 18 to a deformable end portion such as 12. The top and bottom surfaces (the poles) of wafer 18 are silvered over most of the surface area as shown by 38 and 40. The thickness of the silvering is actually measured in terms of micro-inches. Electrodes 20 and 46 are secured to the silvered surface by conductive epoxy layers 42 and 44; again, the epoxy layer is very thin, on the order of micro-inches. Leads 26 and 28 extend from top electrode 20 and circuit leads 22 and 24 extend from lower electrode 46. Finally, the entire wafer assembly is cemented to deformable end portion 12 by an insulating bonding agent that includes silicate microspheres such as Dragonite, made by Jaygo Inc. The microspheres have a diameter of 40-70 microns and provide a secure means for insulating the piezo-electric wafers from the metallic portion of the hydrophone assembly. The wafer assembly is thus completely insulated from end portion 12 and from the sealed case taken as a whole. As previously stated, by convention, the inwardly-facing pole, represented by electrode 20, of piezo-electric wafer 18 is positive and the outwardly-facing pole, represented by electrode 46, is negative.

Figure 5:
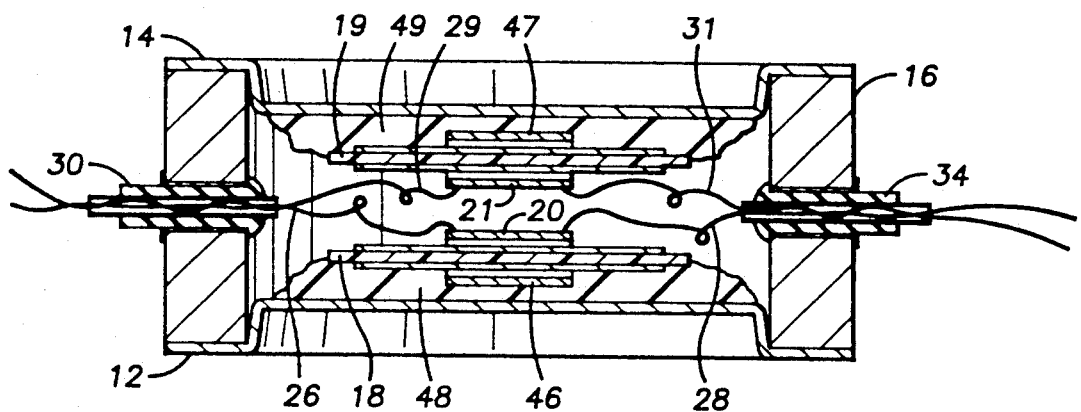
FIG. 5 is a cross sectional view along line 5—5 of FIG. 3 of the assembled hydrophone.

FIG. 5 is a cross section of the assembled hydrophone along line 5—5 of FIG. 3. To avoid complicating the drawing, trunk lines 33 and 35 are not shown in FIG. 5.

The rims of deformable end portions 12 and 14 are soldered or otherwise bonded to wall portion 16. Piezoelectric wafers 18 and 19 are shown secured to deformable end portions 12 and 14 respectively by insulating bonding layers 48 and 49. Leads 26, 29 and 28, 31, connected to electrodes 20 and 21 are inserted into feedthrough terminals 30 and 34 and secured thereto as will be explained in connection with FIG. 6. It is evident from the figure that, in the absence of trunk line 35, the above-listed four leads themselves may serve as a trunk line. In FIG. 5, the inwardly-facing (i.e. like-facing) poles of the polarized piezo-electric wafers are electrically coupled in parallel. Although not shown in FIG. 5 because of the orientation of the cross section, the outwardly-facing poles, represented by electrodes 46 and 47 are also coupled in parallel.

Although not shown in the drawings, an internal stop may be provided to limit the maximum inward excursion of the wafers when they are subjected to an excessive hydrostatic pressure as shown and explained in the '878 patent reference.

Figure 6:
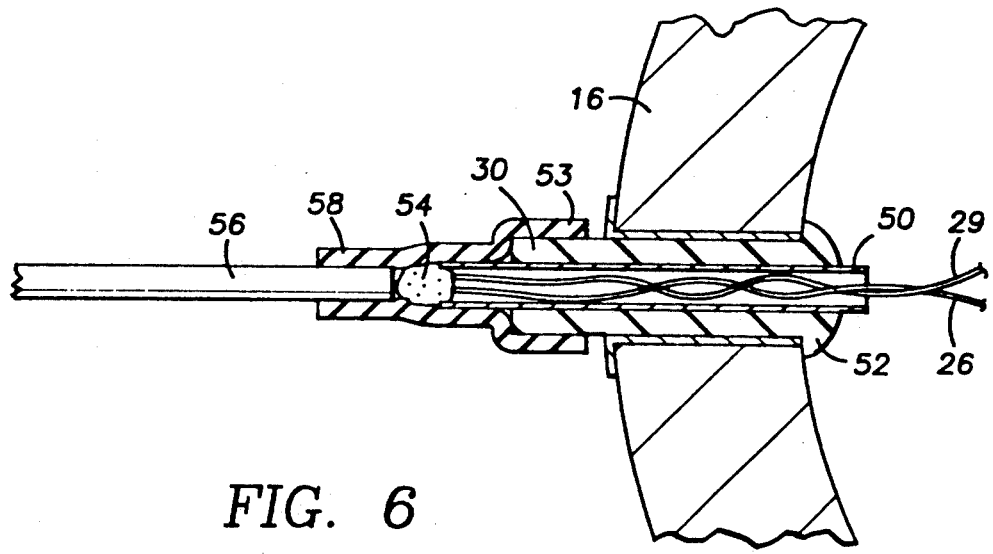
FIG. 6 is a detail of a feed-through terminal.

FIG. 6 shows details, in cross section, of the electrical connections to a typical feed-through terminal 30 which may be the Single Seal terminal made by Hermetic Seals Corp. The seal consists of a hollow metal ferrule 50 sealed to and surrounded by an insulating glass (or other ceramic) bead 52, having an insulated external stem portion 53 that extends though an aperture in wall portion 16. The stem portion 53 is preferably unglazed. A metal collar (not shown), that is integral with the bead 52, is soldered to wall portion 16 after insertion of the terminal through the aperture to provide a hermetic seal. Leads from one pole of the piezo-electric wafer, such as 26, 29 and 35 are inserted through the ferrule 50 of terminal 30. They are connected via a solder joint 54 to one of the conductors such as 56, of a conductor pair 60 (FIG. 7), in a seismic cable (not shown), that is assigned to service a selected hydrophone group. A short length, 58, of heat-shrink tubing such as Alpha FIT-300, is disposed over the insulation of a short portion of wire 56 and over the unglazed external stem portion 53 of terminal 30, thereby covering the solder joint 54. When the heat-shrink tubing is properly heated, it forms a tight mechanical and chemical bond over the terminal stem portion 53 and the wire 56. The end portion 53 of a terminal is preferably unglazed so that the heat-shrink tubing will form a tighter bond thereover. The heat-shrink material, disposed over the terminal 30 and the conductor 56 provides means for inhibiting a conductive water path between terminals with respect to the output signals from the hydrophone. The other three terminals of a hydrophone are similarly configured.

FIG. 7 shows three hydrophones 62, 64 and 66 coupled together in an array for inclusion, by way of example but not by way of limitation, in a seismic streamer cable (not shown). As is well known to the art, a streamer cable may include several hundred discrete hydrophone arrays. A separate conductor pair, such as 60, is assigned to service each one of the individual arrays. One conductor of the pair, such as 56, interconnects the positive poles of the hydrophones while the other conductor interconnects the negative poles. The poled piezo-electric wafers of each hydrophone are preferably connected such that like-facing poles are coupled in parallel, as shown in FIG. 7, to reduce the overall impedance. Conductor pair 60 provides means for interconnecting a plurality of hydrophones into an array by coupling the signal output terminals of a one of the hydrophones with the signal input terminals of the next hydrophone in the array in tandem. The term "tandem" means that the hydrophones are coupled together in an ordered physical sequence; the term does not necessarily mean that the hydrophones are series-coupled in the electrical sense. The combined output signals from the hydrophone array are transmitted over conductor pair 60 to one channel of a multi-channel recording device as shown by the arrows at the right-hand end of conductor pair 60.

A discussion of the presently-preferred mode of operation has been integrated with the description of the preferred embodiment. The specifications for the hydrophones as described are exemplary only. Other methods, materials of construction and applications may be contemplated by those skilled in the art but which will be encompassed by the scope and spirit of the appended claims. For example, the hydrophone of this invention has been described as being useful as a member of an array of hydrophones for use in a marine seismic streamer cable. The hydrophone also could be used advantageously in an array for use in Vertical Seismic Profiling in a fluid-filled borehole. In the preferred embodiment, the piezo-electric wafers are shown internally connected in parallel. They could, of course be internally connected in series if desired.

I claim as my invention:

1. A hydrophone of the type for use as a member of an array of hydrophones for deployment in a body of water, comprising:
   a case having a wall, the ends of the wall being hermetically sealed by deformable end portions having inner and outer surfaces;
   a polarized piezo-electric wafer cemented to the inner surface of each said deformable end portion by an electrically insulating bonding agent, each said wafer defining an inwardly and an outwardly-facing pole;
   bi-polar circuit means for electrically coupling like-facing poles of said polarized piezo-electric wafers and for receiving electrical signals when said wafers are flexed by variations in hydrodynamic pressure applied to said deformable end portions;
   a plurality of feed-through terminal means, including bi-polar signal input and bi-polar signal output terminals, sealingly mounted in and electrically insulated from the wall of said case, a portion of each said terminal means being external to said case;
   bi-polar trunk lines mounted internally of said case for interconnecting the respective signal input and signal output terminals; and
   means for coupling said bi-polar circuit means to corresponding ones of said bi-polar trunk lines for transmitting electrical output signals from said hydrophone.

2. The hydrophone as defined by claim 1, comprising:
   means for interconnecting said hydrophone with other similar-type hydrophones to form an array by electrically coupling the signal output terminals of a one of said hydrophones with the signal input terminals of another of said hydrophones in a tandem arrangement.

3. The hydrophone as defined by claim 2, wherein:
   the external portion of each said terminal includes an insulated stem portion;
   means, disposed over the external stem portion of each said terminal and a portion of the interconnecting means, for inhibiting an electrically conductive water path between terminals with respect to said bi-polar output signals.

4. A hydrophone, comprising:
a case having a wall, opposite ends of the wall being sealed by deformable end portions each having an inner and an outer surface;
a polarized piezo-electric wafer secured to the inner surface of each said deformable end portion by an electrically insulating bond, each said wafer defining an inwardly and an outwardly-facing pole;
bi-polar circuit means for electrically coupling like facing poles of said polarized piezo-electric wafers and for receiving electrical signals therefrom when said wafers are flexed by variations in pressure applied to said deformable end portions;
bi-polar signal input and bi-polar signal output terminals sealingly mounted in and electrically insulated from the wall of said case, a portion of each said terminal being external to said case;
bi-polar trunk line means mounted internally of said case for interconnecting the respective signal input and signal output terminals;
means for coupling said bi-polar circuit means to corresponding ones of said bi-polar trunk lines for transmitting electrical signals from said hydrophone; and
means for inhibiting an electrically conductive path between the external portions of said terminals with respect to said electrical signals.

* * * * *